United States Patent
Tylik et al.

(10) Patent No.: US 11,073,996 B2
(45) Date of Patent: Jul. 27, 2021

(54) HOST RESCAN FOR LOGICAL VOLUME MIGRATION

(71) Applicant: EMC IP Holding Company LLC, Hopkinton, MA (US)

(72) Inventors: Dmitry Tylik, Westborough, MA (US); Michael Zeldich, Newton, MA (US); Vinod K. Rajasekaran, Morrisville, NC (US); Anil K. Koluguri, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 262 days.

(21) Appl. No.: 16/398,774

(22) Filed: Apr. 30, 2019

(65) Prior Publication Data

US 2020/0348872 A1    Nov. 5, 2020

(51) Int. Cl.
*G06F 3/06* (2006.01)
*G06F 9/50* (2006.01)

(52) U.S. Cl.
CPC .......... *G06F 3/0635* (2013.01); *G06F 3/0613* (2013.01); *G06F 3/0647* (2013.01); *G06F 3/0679* (2013.01); *G06F 9/5077* (2013.01)

(58) Field of Classification Search
CPC ........ G06F 3/067; G06F 3/065; G06F 3/0635; G06F 3/0647; G06F 3/0605; G06F 3/0604; G06F 3/0646
See application file for complete search history.

(56) References Cited

U.S. PATENT DOCUMENTS

| | | | |
|---|---|---|---|
| 7,130,941 B2 | 10/2006 | Okada et al. | |
| 7,130,954 B2 | 10/2006 | Obara | |
| 7,634,588 B2 | 12/2009 | Okada et al. | |
| 8,880,934 B2 | 11/2014 | Rangaiah | |
| 8,904,119 B2 | 12/2014 | Yadav et al. | |
| 2005/0050271 A1* | 3/2005 | Honda | G06F 3/067 711/114 |
| 2006/0085607 A1* | 4/2006 | Haruma | G06F 3/067 711/161 |
| 2013/0055248 A1 | 2/2013 | Sokolinski et al. | |
| 2014/0122797 A1 | 5/2014 | Yadav et al. | |
| 2016/0077755 A1 | 3/2016 | McDowell et al. | |

* cited by examiner

*Primary Examiner* — Reginald G Bragdon
*Assistant Examiner* — Thanh D Vo
(74) *Attorney, Agent, or Firm* — BainwoodHuang

(57) ABSTRACT

During preparation for migration of a logical volume from a source data storage appliance to a destination data storage appliance, a determination is made as to whether at least one host that accesses a copy of the logical volume contained in the source data storage appliance is managed by a host administration server. In response to determining that at least one host that accesses the copy of the logical volume contained in the source data storage appliance is managed by the administration server, a rescan request is transmitted to the administration server. The rescan request causes the host administration server to instruct each host that is managed by the host administration server that accesses the copy of the logical volume contained in the source data storage appliance to perform a rescan operation to discover at least one new path to the logical volume.

20 Claims, 5 Drawing Sheets

HOST RESCAN FOR LOGICAL VOLUME MIGRATION

TECHNICAL FIELD

The present disclosure relates generally to techniques for providing a logical volume of non-volatile data storage from a data storage system to a host computer system, and more specifically to technology for causing one or more hosts accessing a logical volume on a source data storage appliance to automatically perform a rescan operation in order to discover a path to a destination data storage appliance prior to migrating the logical volume from the source data storage appliance to the destination data storage appliance.

BACKGROUND

Data storage systems are arrangements of hardware and software that typically provide non-volatile data storage from non-volatile data storage devices that they contain or are communicably connected to, such as magnetic disk drives, electronic flash drives, and/or optical drives. Data storage systems service host I/O operations (e.g. I/O reads, writes, etc.) that they receive from host computers ("hosts"). The received host I/O operations specify one or more logical data storage objects (e.g. logical volumes, sometimes also referred to as logical units or "LUNs"), and indicate host I/O data that is to be written to or read from the storage objects. Data storage systems include specialized hardware and execute specialized software that process incoming host I/O operations and perform various data storage tasks to organize and secure the host I/O data that is received from the hosts and store the received host I/O data on the physical non-volatile data storage devices of the data storage system. A data storage system may sometimes include or consist of a cluster of data storage appliances.

Under various types of circumstances, it may be desirable to migrate a logical volume, e.g. from a source data storage appliance to a destination data storage appliance within a cluster of data storage appliances. Examples of such circumstances include without limitation resource imbalances that may arise between different data storage appliances, such as an inadequate amount of resources (e.g. storage, processing, and/or network resources) being available to support the logical volume on the source data storage appliance, and a sufficient or more sufficient amount of resources being available to support the logical volume on the destination data storage appliance.

SUMMARY

When a logical volume is migrated from a source data storage appliance to a destination data storage appliance, a copy of the logical volume may be created in the destination data storage appliance, and host data stored in a copy of the logical volume contained in the source data storage appliance moved to the copy of the logical volume contained in the destination data storage appliance. Migration of the logical volume may cause the host or hosts that, prior to the migration, accessed the copy of the logical volume contained in the source data storage appliance, to access the copy of the logical volume contained in the destination data storage appliance after the migration.

The disclosed technology advantageously avoids shortcomings that may arise with regard to performing host rescan operations prior to migrating the logical volume, in order for the hosts to discover a path to the copy of the logical volume contained in the destination data storage appliance. Specifically, to prepare for migrating the logical volume from the source data storage appliance to the destination data storage appliance, a path to the copy of the logical volume in the destination data storage appliance is created, so that the path to the copy of the logical volume in the destination data storage appliance can be discovered by each of the hosts that before the migration access the copy of the logical volume on the source data storage appliance. In order for hosts to discover the path to the copy of the logical volume in the destination data storage appliance, rescan operations (e.g. SCSI rescans) must be performed by the hosts. However, in some previous technologies, the rescan operations had to be manually performed on the hosts by a human administrator. The requirement of such manual rescan operations introduced the possibility of human errors, and consumed significant amounts of administrator time. In the event that human error resulted in the rescan operation not being performed for one or more hosts that access the logical volume to be migrated, or in the event that the rescan operation was incorrectly or only partly performed for one or more hosts, situations sometimes arose in such previous technologies that caused a data unavailability condition to occur with regard to the host data stored on the logical volume.

It would accordingly be desirable to have new technology that reduces the risk of human errors or mistakes with regard to rescan operations that are performed in preparation for migrating a logical volume from a source data storage appliance to a destination data storage appliance.

To address the above described and/or other technical problems, the disclosed technology operates, during preparation for migration of a logical volume from a source data storage appliance to a destination data storage appliance, by detecting whether at least one host that accesses a copy of the logical volume contained in the source data storage appliance is managed by a host administration server. In response to detecting that at least one host that accesses the copy of the logical volume contained in the source data storage appliance is managed by the host administration server, a rescan request is transmitted to the host administration server. The rescan request causes the host administration server to instruct each host that is managed by the host administration server that accesses the copy of the logical volume contained in the source data storage appliance to perform a rescan operation, thus enabling those hosts to discover a new path to the logical volume on the destination data storage appliance.

In some embodiments, the disclosed technology may perform the steps of i) detecting whether at least one host that accesses the copy of a logical volume contained in the source data storage appliance is managed by the host administration server, and ii) transmitting the rescan request to the host administration server, in response to receipt of a request to migrate the logical volume from the source data storage appliance to the destination data storage appliance.

In some embodiments, prior to transmitting the host rescan request to the host administration server, the disclosed technology may create a copy of the logical volume in the destination data storage appliance. A path to the copy of the logical volume contained in the destination data storage appliance is discoverable by the rescan operation performed by each host that is managed by the host administration server.

In some embodiments, the path to the copy of the logical volume contained in the destination storage appliance may include a target port contained in the destination data storage appliance through which the copy of the logical volume contained in the destination data storage appliance can be accessed.

In some embodiments, prior to migrating the logical volume, the disclosed technology may set a path state of the path to the copy of the logical volume contained in the destination data storage appliance to unavailable.

In some embodiments, the disclosed technology may set the path state of the path to the copy of the logical volume contained in the destination data storage appliance to unavailable at least in part by storing the path state of the path to the copy of the logical volume contained in the destination storage appliance within the source data storage appliance. In some embodiments, the disclosed technology may set the path state of the path to the copy of the logical volume contained in the destination data storage appliance to unavailable at least in part by storing the path state of the path to the copy of the logical volume contained in the destination storage appliance within the destination data storage appliance.

In some embodiments, the disclosed technology may begin migration of the logical volume from the source data storage appliance to the destination data storage appliance at least partly in response to detecting that all hosts that accessed the copy of the logical volume contained in the source data storage appliance prior to migration have performed a rescan operation.

In some embodiments, migrating the logical volume from the source data storage appliance may include moving host data stored in the copy of the logical volume contained in the source data storage appliance to the copy of the logical volume contained in the destination data storage appliance.

In some embodiments, migrating the logical volume from the source data storage appliance may include changing the path state of the path to the copy of the logical volume contained in the destination data storage appliance from unavailable to active.

In some embodiments, migrating the logical volume from the source data storage appliance to the destination data storage appliance may include changing a path state of a path to the copy of the logical volume contained in the source data storage appliance from active to unavailable.

Embodiments of the disclosed technology may provide significant advantages over previous technologies. For example, embodiments of the disclosed technology may advantageously reduce or eliminate the need for a human administrator to manually perform rescan operations on one or more hosts when preparing for migration of a logical volume. Embodiments of the disclosed technology may accordingly reduce the possibility of human errors, and require less administrator time. As a result, the disclosed technology avoids situations in which the migration of the logical volume fails or is delayed for one or more hosts, and therefore prevents data unavailable conditions from occurring with regard to host data that is stored in the logical volume being migrated.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments will now be described with reference to the figures. Such embodiments are provided only by way of example and for purposes of illustration. The scope of the claims is not limited to the examples of specific embodiments shown in the figures and/or otherwise described herein.

The individual features of the particular embodiments, examples, and implementations described herein can be combined in any manner that makes technological sense. Such features are hereby combined to form all possible combinations, permutations and/or variations except to the extent that such combinations, permutations and/or variations have been expressly excluded herein and/or are technically impractical. The description in this document is intended to provide support for all such combinations, permutations and/or variations.

As described herein, during preparation for migration of a logical volume from a source data storage appliance to a destination data storage appliance, the disclosed technology detects whether at least one host that accesses a copy of the logical volume contained in the source data storage appliance is managed by a host administration server. In response to detecting that at least one host that accesses the copy of the logical volume contained in the source data storage appliance is managed by the host administration server, the disclosed technology transmits a rescan request to the host administration server. The rescan request causes the host administration server to instruct each host that is managed by the host administration server and that accesses the copy of the logical volume contained in the source data storage appliance to perform a rescan operation to discover at least one new path to the logical volume, e.g. a path to a copy of the logical volume contained in the destination data storage appliance.

Figure 1:
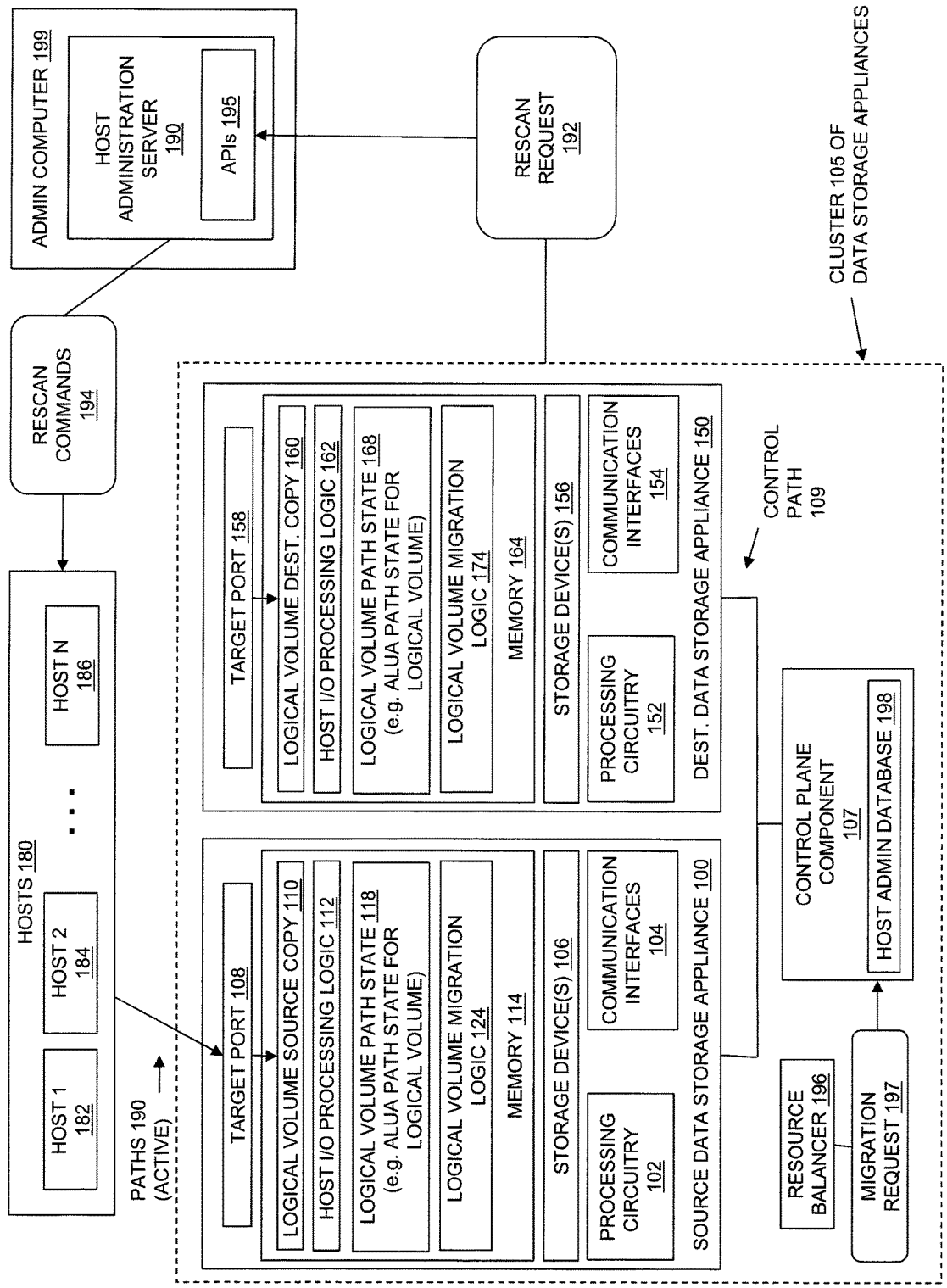
FIG. 1 is a block diagram showing an example of components in some embodiments in an example of an operational environment.

FIG. 1 is a block diagram showing an example of components in an operational environment including an example of an embodiment of the disclosed technology. As shown in FIG. 1, a Cluster 105 includes multiple data storage appliances, shown for purposes of illustration by Source Data Storage Appliance 100, and Destination Data Storage Appliance 150. While two data storage appliances are shown for purposes of illustration in the example of FIG. 1, Cluster 105 may include additional data storage appliances. Moreover, the technology disclosed herein is not limited to embodiments in which clusters are made up of a specific number of data storage appliances, and may be embodied in clusters having various other specific numbers of data storage appliances.

Each one of the data storage appliances in Cluster 105 contains and/or is communicably coupled to one or more non-volatile data storage devices, such as one or more magnetic disk drives, one or more electronic flash drives, and/or one or more optical drives. In the example of FIG. 1, Source Data Storage Appliance 100 is shown including Storage Devices 106, and Destination Data Storage Appliance 150 is shown including Storage Devices 156.

Each one of the data storage appliances in Cluster 105 also includes communication circuitry that is operable to connect to, and transmit and receive data signals over, one or more communication networks connecting the data storage appliances in Cluster 105 to each other, and also connecting the data storage appliances in Cluster 105 to Hosts 180. In the example of FIG. 1, Source Data Storage Appliance 100 is shown including Communication Interfaces 104, and Destination Data Storage Appliance 150 is shown including Communication Interfaces 154. Communication Interfaces 104 and Communication Interfaces 154 may each include or consist of SCSI target adapters and/or network interface adapters or the like for converting electronic and/or optical signals received over the network or networks that interconnect the data storage appliances in Cluster 105, and/or a network or networks that further connect the data storage appliances in Cluster 105 to Hosts 180, into electronic form for use by the respective data storage appliance.

For example, communications between the data storage appliances in Cluster 105 may be performed using the Small Computer System Interface (SCSI) protocol, through paths in a communication network connecting the Hosts 180 and the data storage appliances. The paths may include or consist of paths between SCSI initiator ports in each of the Hosts 180 and SCSI target ports in the communication interfaces of the data storage appliances. For example, Hosts 180 are shown including Host 1 182, Host 2 184, through Host N 186. Each host in Hosts 180 may include or consist of a hardware computer system, one or more virtual machines, and/or a hypervisor on which one or more virtual machines executes. Each host in Hosts 180 may include one or more SCSI host adapters, providing one or more SCSI initiator ports. The communication interfaces of each data storage appliance in Cluster 105 may provide SCSI target adapters having some number of target ports. In the example of FIG. 1, for purposes of illustration, Source Data Storage Appliance 100 is shown including at least Target Port 108, and Destination Data Storage Appliance 150 is shown including at least Target Port 158.

Each one of the data storage appliances in Cluster 105 includes processing circuitry for executing program code. In the example of FIG. 1, Source Data Storage Appliance 100 is shown including Processing Circuitry 102, and Destination Data Storage Appliance 150 is shown including Processing Circuitry 152. Processing Circuitry 102 and Processing Circuitry 152 may each include or consist of one or more central processing units (CPUs) and associated electronic circuitry.

Each one of the data storage appliances in Cluster 105 also includes a memory operable to store program code and/or associated data structures operable when executed by the processing circuitry to cause the processing circuitry to perform various functions and provide various features of the disclosed technology. In the example of FIG. 1, Source Data Storage Appliance 100 is shown including Memory 114, and Destination Data Storage Appliance 150 is shown including Memory 164. Memory 114 and Memory 164 may each include or consist of volatile memory (e.g., RAM), and/or non-volatile memory, such as one or more ROMs, disk drives, solid state drives, and the like.

The memory in each data storage appliance stores various specific program code that is executable by the processing circuitry of the data storage appliance, and associated data structures used during the execution of the program code. For purposes of illustration, program code that is executable on data storage appliance processing circuitry to cause the processing circuitry to perform operations and functions described herein with regard to each storage appliance is shown in part by logical volume migration logic stored in the memory of each one of the data storage appliances. For example, Logical Volume Migration Logic 124 in Source Data Storage Appliance 100 is operable when executed to cause Processing Circuitry 102 to perform operations and functions described herein, including preparation for migration and migration of a logical volume, and Logical Volume Migration Logic 174 is also operable when executed to cause Processing Circuitry 152 to perform operations and functions described herein, including preparation for migration and migration of a logical volume. In some embodiments, Logical Volume Migration Logic 124 and/or Logical Volume Migration Logic 174 may each include or consist of some number of Application Programming Interfaces (APIs) that are accessible to Control Plane Component 107.

Control Plane Component 107 may be contained in the memory of and executed on the processing circuitry of another data storage appliance in Cluster 105, and/or contained in the memory of and executed on the processing circuitry of Source Data Storage Appliance 100 and/or Destination Data Storage Appliance 150, to cause such processing circuitry to perform the operations and functions described herein, including preparation for migration and migration of a logical volume. Host I/O Processing Logic 112 in Memory 114 is operable when executed to cause Processing Circuitry 102 to process host I/O operations received from Hosts 180, e.g. SCSI commands conveyed to Source Data Storage Appliance 100 over the Paths 190 that extend from initiator ports in Hosts 180 to Target Port 108, and are directed to the copy of the logical volume in Source Data Storage Appliance 100, i.e. Logical Volume Source Copy 110. Host I/O Processing Logic 162 in Memory 164 is operable when executed to cause Processing Circuitry 152 to process host I/O operations received from Hosts 180, e.g. SCSI commands conveyed to Destination Data Storage Appliance 150 over paths from initiator ports in Hosts 180 to Target Port 158, and directed to the copy of the logical volume Destination Data Storage Appliance 150, i.e. Logical Volume Destination Copy 160.

In the example of FIG. 1, the logical volume has not yet been migrated from Source Data Storage Appliance 100 to Destination Data Storage Appliance 150. Prior to migration of the logical volume, hosts, such as Hosts 180, only access the logical volume on Source Data Storage Appliance 100, e.g. by accessing Logical Volume Source Copy 110. Prior to preparation for migration of the logical volume, only Paths 190 have been established from Hosts 180 to the Logical Volume Source Copy 110 on Source Data Storage Appliance 100 (e.g. through Target Port 108). Paths 190 extend from initiator ports in Hosts 180 to Target Port 108. At the point in time illustrated by FIG. 1, paths have not yet been established between Hosts 180 and Destination Data Storage Appliance 150. Further in the example illustrated by FIG. 1, Paths 190 have a state of "active" (e.g. Active-Optimized or Active-Non-Optimized), which indicates to Hosts 180 that Logical Volume Source Copy 110 can be accessed over Paths 190. Indications of the path state for each path in Paths 190 may be stored in Logical Volume Path State 118 and/or Logical Volume Path State 168. For example, each of Logical Volume Path State 118 and Logical Volume Path State 168 may store a copy of at least a portion of the Asymmetric Logical Unit Access (ALUA) state for the logical volume being migrated, thus making the ALUA state for the logical volume present in and accessible to Hosts 180 from both Source Data Storage Appliance 100 and Destination Data Storage Appliance 150. As it is generally known, ALUA is an industry standard protocol described in the T10 SCSI-3 specification SPC-3. Logical Volume Path State 118 and Logical Volume Path State 168 may both indicate the current state of all current paths (e.g. Paths 190 in FIG. 1, Paths 190 and 192 in FIGS. 3 and 4) for accessing the logical volume being migrated, and may be part of the ALUA state that is associated with that logical volume. The ALUA state for the logical volume may be obtained by Host Computer 180 with regard to each target port group that contains a target port through which a copy of the logical volume can be accessed. Accordingly, Logical Volume Path State 118 and Logical Volume Path State 168 may be the same in Source Data Storage Appliance 100 and Destination Data Storage Appliance 150 at any given point in time, and may be obtained by Host Computer 180 by issuing a SCSI Report Target Port Group (RTPG) command to a target port group that contains Target Port 108, and/or by issuing an RTPG command to a target port group that contains Target Port 158. As described below, migration of the logical volume results in the states of the paths in Paths 190 being changed to unavailable, and the states of Paths 192 (see FIG. 3 and FIG. 4) being changed from unavailable to active, so that after the logical volume is migrated from Source Data Storage Appliance 100 to Destination Data Storage Appliance 150, hosts such as Hosts 180 no longer access the logical volume through Logical Volume Source Copy 110, and instead access the logical volume through Logical Volume Destination Copy 160.

Although certain program code and data structures are specifically shown in FIG. 1, each data storage appliance may additionally include various other program code and/or other software constructs that are not shown but may be additional to those shown, and that are operable in whole or in part to perform specific functions and/or operations described herein. Such additional program logic and other software constructs may include without limitation an operating system, various applications, and/or other processes and/or data structures.

Each data storage appliance in Cluster 105 may also include mappings and allocations that store indications of units of non-volatile data storage that are allocated from the non-volatile data storage devices in that storage appliance to various logical volumes and/or other data storage objects that are provided by that storage appliance. The units of non-volatile data storage allocated to a logical volume may be mapped to respective portions of a logical volume, and may be used to persistently store host data directed to the logical volume in host I/O operations (e.g. write I/O operations) that are received from Host Computer 180. A "slice" is one example of the units of non-volatile data storage (e.g. 256 megabytes or 1 gigabytes in size) that may be allocated from a non-volatile data storage device to a storage object such as a logical volume. Host I/O Processing Logic 112 in Source Data Storage Appliance 100 may store indications of units of non-volatile data storage that are allocated from Storage Device(s) 106 to logical volumes contained in Source Data Storage Appliance 100, and/or the mappings of such units of non-volatile data storage to respective portions the logical volumes to which they are allocated. Host I/O Processing Logic 162 in Destination Data Storage Appliance 150 may store indications of units of non-volatile data storage that are allocated from Storage Device(s) 156 to logical volumes in Destination Data Storage Appliance 150, and/or the mappings of such units of non-volatile data storage to respective portions the logical volumes to which they are allocated.

The data storage appliances in Cluster 105 provide data storage services that are consumed by hosts such as Hosts 180, e.g. by one or more applications executing in Hosts 180. Each one of the data storage appliances in Cluster 105 may expose a set of logical volumes (also sometimes referred to as logical units or "LUNS") to hosts including the Hosts 180. In some embodiments, the data storage services provided by the data storage appliances in Cluster 105 include one or more block-based storage services that provide Hosts 180 with blocks of non-volatile data storage from the logical volumes. Such block-based data storage services may, for example, employ the Small Computer System Interface (SCSI) protocol, the Internet Small Computer System Interface (iSCSI) protocol, and/or Fibre Channel (FC) network technology to communicate between the Host Computer 180 and the data storage appliances in Cluster 105.

While in the example of FIG. 1, Hosts 180 are shown external to Cluster 105, the techniques described herein are not limited to such embodiments. Alternatively, Hosts 180 may be located in whole or in part together with the data storage appliances in Cluster 105, as in the case of a hyper-converged storage array that hosts both data storage and compute resources.

Also shown in FIG. 1 is an Administration Computer 199. Administration Computer 199 includes processing circuitry and memory, the memory storing program code that executes on the processing circuitry, including a Host Administration Server 190. Host Administration Server 190 manages Hosts 180. Accordingly, Host Administration Server 190 has access to Hosts 180 (e.g. administrator access), and is capable of and responsible for performing and/or causing performance of administration operations on Hosts 180, e.g. by way of commands issued from Host Administration Server 190 to the Hosts 180. For example, Host Administration Server 190 may include program logic that, when executed, issues one or more commands to each one of Hosts 180 that cause each one of Hosts 180 to perform a SCSI rescan across the data storage appliances contained in Cluster 105, in order to discover paths to logical volumes hosted by the data storage appliances in Cluster 105. Administration Computer 199 is communicably connected both to Hosts 180 and Cluster 105, e.g. over one or more computer networks. In some embodiments, Control Plane Component 107 operates as a client with regard to Host Administration Server 190, and may determine information regarding Hosts 180 and/or communicate various requests to Host Administration Server 190 through some number of Application Programming Interfaces (APIs) in Host Administration Server 190, shown in FIG. 1 by APIs 195. In some embodiments, Control Plane Component 107 may have stored within it identifying information that can be used to identify and communicate with Host Administration Server 190, and credentials that may be presented to Host Administration Server 190 to allow Control Plane Component 107 to gain access to the administration features provided by Host Administration Server 190, e.g. through one or more of the APIs 195. For example, such identifying information for Host Administration Server 190 stored in Control Plane Component 107 may include an Internet Protocol (IP) address of Host Administration Server 190 and/or a Fully Qualified Domain Name (FQDM) of Host Administration Server 190. Such credentials that allow access to Host Administration Server 190 may, for example, include a username and password or the like that enable Control Plane Component 107 to access a system administrator account in Host Administration Server 190.

During operation of the components shown in FIG. 1, Control Plane Component 107 receives a request to migrate a logical volume, e.g. Migration Request 197. Migration Request 197 requests that Control Plane Component 107 perform operations that cause the logical volume to be migrated from Source Data Storage Appliance 100 to Destination Data Storage Appliance 150, e.g. that cause host access to the logical volume to be changed from the Logical Volume Source Copy 110 in Source Data Storage Appliance 100 to the Logical Volume Destination Copy 160 in Destination Data Storage Appliance 150. Migration Request 197 may be generated in response to various conditions or circumstances, including without limitation resource imbalances that may arise between Source Data Storage Appliance 100 and Destination Data Storage Appliance 150, such as an inadequate amount of resources (e.g. storage, processing, and/or network resources) being available to support the logical volume on Source Data Storage Appliance 100, and/or a sufficient or more sufficient amount of resources being available to support the logical volume on Destination Data Storage Appliance 150, and/or other conditions or circumstances. In some embodiments, Migration Request 197 may be manually generated by a storage resource administrator user based on automatically detected and/or manually observed resource imbalances, and passed to Control Plane Component 107 from a storage resource administration computer (not shown). Alternatively, Migration Request 197 may be automatically generated by a Resource Balancer 196 component that may execute on one or more of the data storage appliances in Cluster 105, and which may automatically generate Migration Request 197 in response to automatic detection of one or more significant resource imbalances within Cluster 105, e.g. between Source Data Storage Appliance 100 and Destination Data Storage Appliance 150.

In response to Migration Request 197, Control Plane Component 107 performs a number of operations in preparation for the migration of the logical volume from Source Data Storage Appliance 100 to Destination Data Storage Appliance 150. The operations performed by Control Plane Component 107 in preparation for migration of the logical volume from Source Data Storage Appliance 100 to Destination Data Storage Appliance 150, and performed in response to receipt of Migration Request 197, include detecting whether at least one host that accesses the logical volume in Source Data Storage Appliance 100 (e.g. that accesses Logical Volume Source Copy 110 in Source Data Storage Appliance 100 prior to migration of the logical volume), is managed by Host Administration Server 190. For example, the various hosts that access Logical Volume Source Copy 110 may in some circumstances include only hosts that are managed by Host Administration Server 190. In other circumstances the various hosts that access Logical Volume Source Copy 110 may include some hosts that are Managed by Host Administration Server 190 and some other hosts that are not managed by Host Administration Server 190, and in other circumstances the various hosts that access Logical Volume Source Copy 110 may include no hosts that are managed by Host Administration Server 190.

In some embodiments, Control Plane Component 107 may maintain a Host Administration Database 198. Host Administration Database 198 may store information including indications of which hosts access Logical Volume Source Copy 110 in Source Data Storage Appliance 100, and which hosts are managed by Host Administration Server 190. The information stored in Host Administration Database 198 may be manually entered by a storage administrator, and/or automatically obtained prior to the migration of the logical volume by Control Plane Component 107 from Host Administration Server 190, e.g. through one or more of the APIs 195. In some embodiments, Control Plane Component 107 may detect whether at least one host that accesses the copy of the logical volume in Source Data Storage Appliance 100 prior to the migration (i.e. that accesses Logical Volume Source Copy 110 prior to the migration) is managed by Host Administration Server 190 by querying the contents of Host Administration Database 198.

Further in response to receipt of Migration Request 197, and in response to detecting that at least one host that accesses the logical volume on Source Data Storage Appliance 100 prior to the migration (e.g. that accesses Logical Volume Source Copy 110 prior to the migration) is managed by Host Administration Server 190, Control Plane Component 107 transmits Rescan Request 192 to the Host Administration Server 190. For example, Control Plane Component 107 may use the identification information and credentials it stores regarding Host Administration Server 190 to gain access to Host Administration Server 190 and issue Rescan Request 192 to one of the APIs 195.

Figure 2:
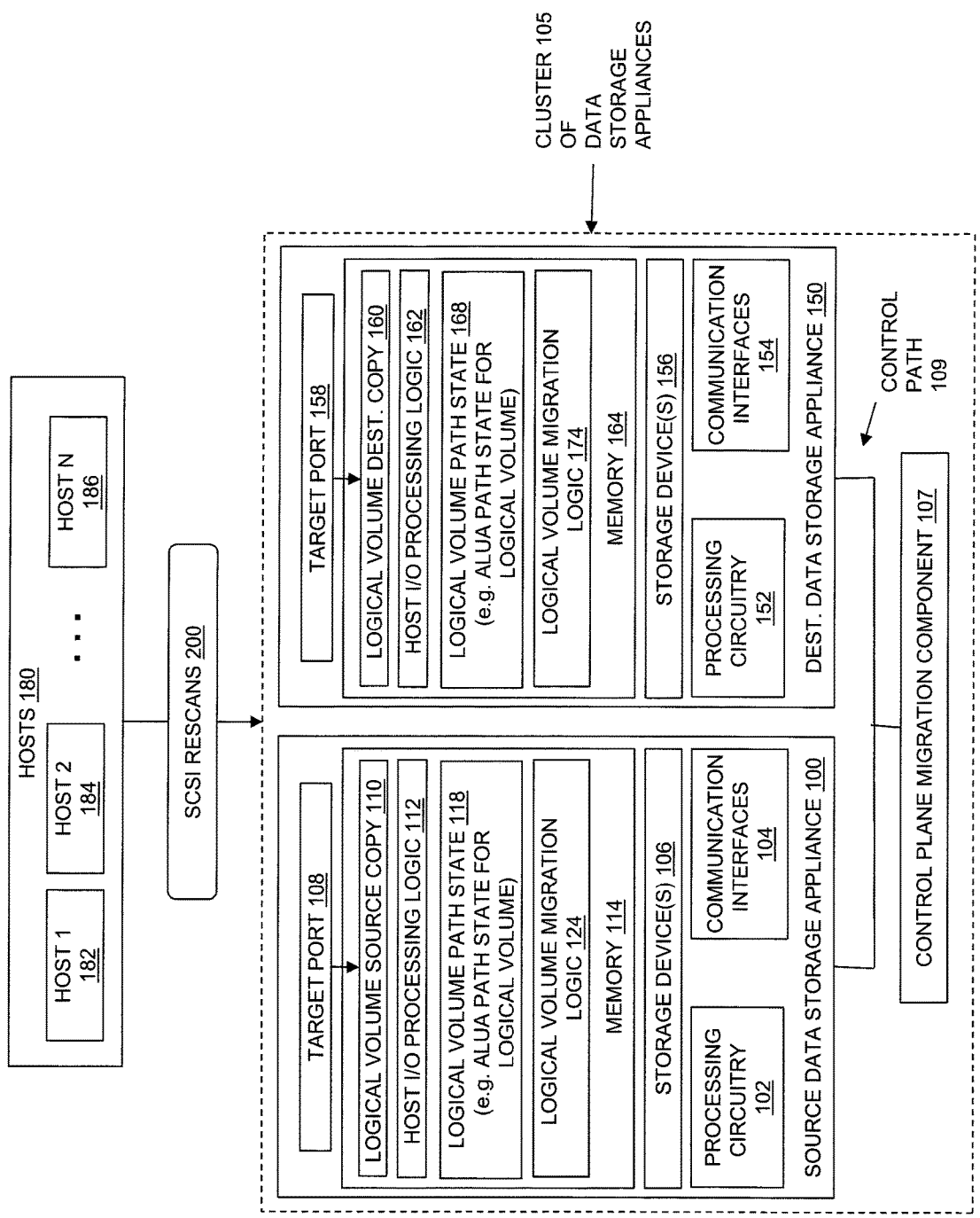
FIG. 2 is a block diagram showing an example of components in some embodiments while hosts perform rescans on data storage appliances.

Rescan Request 192 causes Host Administration Server 190 to instruct each host that is managed by Host Administration Server 190 that accesses Logical Volume Source Copy 110 prior to the migration to perform a SCSI rescan operation with regard to the data storage appliances contained in Cluster 105 (see FIG. 2). For example, Host Administration Server 190 may transmit Rescan Commands 194 to hosts within Hosts 180 that access Logical Volume Source Copy 110 prior to the migration, in order to cause each one of those hosts perform a SCSI rescan operation with regard to the data storage appliances in Cluster 105, so that those hosts will each discover a new path to the logical volume, e.g. will discover a path through Target Port 158 to Logical Volume Destination Copy 160 in Destination Data Storage Appliance 150. In some cases, for example, all hosts that access Logical Volume Source Copy 110 prior to the migration may be within Hosts 180, and Host Administration Server 190 may accordingly be able to transmit Rescan Commands 194 to every host that accesses the logical volume in Source Data Storage Appliance 100 prior to the migration. In cases where some of the hosts that access the logical volume on Source Data Storage Appliance 100 prior to the migration are not managed by Host Administration Server 190, Control Plane Component 107 may additionally or alternatively issue one or more indications (notification, alerts, etc.) to a storage resource administration computer that SCSI rescan operations are to be manually performed on those hosts by a storage administrator user.

In some embodiments, prior to transmission of Host Rescan Request 192 to Host Administration Server 190, and further in response to Migration Request 197, Control Plane Component 107, and/or Logical Volume Migration Logic 124, and/or Logical Volume Migration Logic 174 may create the copy of the logical volume in the destination data storage appliance, e.g. may create Logical Volume Destination Copy 160. A path to Logical Volume Destination Copy 160 is then discoverable by any subsequently performed SCSI rescan operation, e.g. by each SCSI rescan performed by a host in Hosts 180 in response to Rescan Commands 194.

In some embodiments, the path to Logical Volume Destination Copy 160 may include a target port contained in Destination Data Storage System 150, e.g. Target Port 158. Logical Volume Destination Copy 160 is reachable through Target Port 158. Accordingly, when Logical Volume Destination Copy 160 is created in Destination Data Storage Appliance 150, it may be created such that it is discoverable and/or accessible through Target Port 158, and such that paths to Logical Volume Destination Copy 160 in Destination Data Storage Appliance 150 include and/or pass through Target Port 158.

In some embodiments, also prior to migration and/or prior to transmission of Host Rescan Request 192 to Host Administration Server 190, Control Plane Component 107, and/or Logical Volume Migration Logic 124, and/or Logical Volume Migration Logic 174 may set a path state of paths to Logical Volume Destination Copy 160 through Target Port 158 to unavailable. For example, the ALUA state of any path to Logical Volume Destination Copy 160 through Target Port 158 may be set to unavailable prior to migration (see Paths 192 within an unavailable state prior to migration in FIG. 3). In this way, at the time when each path to Logical Volume Destination Copy 160 is discovered through the SCSI rescans performed as a result of Rescan Commands 194, no hosts in Hosts 180 will be able to access Logical Volume Destination Copy 160 until the state of the path to Logical Volume Destination Copy 160 is later changed to active as a result the logical volume being migrated from Source Data Storage Appliance 100 to Destination Data Storage Appliance 150 (see Paths 192 with an active state after migration as shown in FIG. 4).

In some embodiments, also prior to migration and/or transmission of Host Rescan Request 192 to Host Administration Server 190, Control Plane Component 107, and/or Logical Volume Migration Logic 124, and/or Logical Volume Migration Logic 174 may store the unavailable path state for paths to Logical Volume Destination Copy 160 through Target Port 158 within Source Data Storage Appliance 100, e.g. within Logical Volume Path State 118. Accordingly, any host that discovers a path to Logical Volume Destination Copy 160 during a subsequently performed SCSI rescan resulting from Rescan Commands 194 also obtains the pre-migration unavailable path state for that path from Source Data Storage Appliance 100, e.g. over Paths 190.

In some embodiments, also prior to transmission of Host Rescan Request 192 to Host Administration Server 190, Control Plane Component 107, and/or Logical Volume Migration Logic 124, and/or Logical Volume Migration Logic 174 may store the unavailable path state for paths to Logical Volume Destination Copy 160 through Target Port 158 within Destination Data Storage Appliance 150, e.g. within Logical Volume Path State 168. Accordingly, any host that discovers a path to Logical Volume Destination Copy 160 during a subsequently performed SCSI rescan resulting from Rescan Commands 194 may also obtain the pre-migration unavailable path state for that path from Destination Data Storage Appliance 150.

In some embodiments, Control Plane Component 107, and/or Logical Volume Migration Logic 124, and/or Logical Volume Migration Logic 174 may begin migration of the logical volume from Source Data Storage Appliance 100 to Destination Data Storage Appliance 150 in response to detecting that all hosts that accessed the logical volume in Source Data Storage Appliance 100 have successfully performed a SCSI rescan to discover a path to Logical Volume Destination Copy 160. Accordingly, migration of the logical volume may be started at least partly in response to detecting that the hosts that are managed by Host Administration Server 190 and that access the logical volume in Source Data Storage Appliance 100 (i.e. access Logical Volume Source Copy 110) prior to migration of the logical volume have performed a rescan operation. For example, Control Plane 107 may check an API within APIs 195 for a completion status regarding the Rescan Request 192. The completion status provided by the API may indicate whether all hosts that access the logical volume in Source Data Storage Appliance 100 prior to the migration, and that are managed by Host Administration Server 190, have successfully performed a SCSI rescan of the data storage appliances in Cluster 105. In the case where all hosts that access the logical volume are within Hosts 180, and the completion status indicates that all such hosts have performed a SCSI rescan, then Control Plane Component 107, and/or Logical Volume Migration Logic 124, and/or Logical Volume Migration Logic 174, may begin migrating the logical volume from Source Data Storage Appliance 100 to Destination Data Storage Appliance 150. In the case where the completion status indicates that less than all such hosts have performed a SCSI rescan, then Control Plane Component 107 may issue one or more indications to a storage resource administration computer indicating that SCSI rescan operations must still be manually performed on the hosts on which SCSI rescans were not successfully performed as a result of Rescan Commands 194.

Migrating the logical volume from Source Data Storage Appliance 100 to Destination Data Storage Appliance 150 may include Control Plane Component 107, and/or Logical Volume Migration Logic 124, and/or Logical Volume Migration Logic 174 moving (e.g. copying) the host data stored in Logical Volume Source Copy 110 to Logical Volume Destination Copy 160. For example, moving the host data from Logical Volume Source Copy 110 to Logical Volume Destination Copy 160 during the migration process may include copying one or more snapshots (point in time copies) of the Logical Volume Source Copy 110 to Destination Data Storage Appliance 150 for storage into the Logical Volume Destination Copy 160, and/or synchronously mirroring host I/O operations that are directed to the logical volume to both Source Data Storage Appliance 100 and Destination Data Storage Appliance 150 for some period of time, such that the host I/O operations directed to the logical volume are synchronously performed on both Source Data Storage Appliance 100 and Destination Storage Appliance 150, until the contents of Logical Volume Destination Copy 160 are the same as the contents of Logical Volume Source Copy 110. Such host data movement between Source Data Storage Appliance 100 and Destination Data Storage Appliance 150 may be performed automatically in the background, e.g. through one or more communication paths external to any paths between Cluster 105 and the Hosts 180, so that the data movement is performed transparently with regard to Hosts 180, and such that there is no interference with or interruption to the data storage services provided from the data storage appliances in Cluster 105 to Hosts 180.

In some embodiments, migrating the logical volume from Source Data Storage Appliance 100 to Destination Data Storage Appliance 150 by Control Plane Component 107, and/or Logical Volume Migration Logic 124, and/or Logical Volume Migration Logic 174 may include changing the path state of the paths from one or more of the Hosts 180 to the copy of the logical volume contained in Destination Data Storage Appliance 150 (e.g. the path state of all paths to Logical Volume Destination Copy 160 from initiator ports in Hosts 180 through Target Port 158) from the unavailable path state to the active path state (see Paths 192 after migration in FIG. 4). For example, the ALUA path state for all paths from initiator ports in Hosts 180 to Logical Volume Destination Copy 160 through Target Port 158 may be changed from the unavailable path state to the active path state in Logical Volume Path State 118 and/or Logical Volume Path State 168 during the migration process.

In some embodiments, migrating the logical volume from Source Data Storage Appliance 100 to Destination Data Storage Appliance 150 by Control Plane Component 107, and/or Logical Volume Migration Logic 124, and/or Logical Volume Migration Logic 174 may include changing the path state of the paths from Hosts 180 to the copy of the logical volume contained in Source Data Storage Appliance 100 (e.g. the path state of all paths to Logical Volume Source Copy 110 from initiator ports in Hosts 180 through Target Port 108) from the active path state to the unavailable path state (see Paths 190 after the migration process as illustrated in FIG. 4). For example, the ALUA path state for all paths between initiator ports in Hosts 180 to Logical Volume Source Copy 110 through Target Port 108 may be changed from the active path state to the unavailable path state in Logical Volume Path State 118 and/or Logical Volume Path State 168 during the migration process.

FIG. 2 is a block diagram showing an example of components in some embodiments while one or more hosts perform rescans on data storage appliances in the Cluster 105. Specifically, one or more of the Hosts 180 are shown performing SCSI Rescans 200 on the data storage appliances in Cluster 105, e.g. in response to Rescan Commands 194 issued from Host Administration Server 190, as shown in FIG. 1. The SCSI Rescans 200 result in those hosts in Hosts 180 that accessed the logical volume in Source Data Storage Appliance 100 prior to migration of the logical volume (e.g. that accessed Logical Volume Source Copy 110 prior to migration of the logical volume) discovering a path to the logical volume in Destination Data Storage Appliance 150 (e.g. discovering a path to Logical Volume Destination Copy 160 through Target Port 158).

Figure 3:
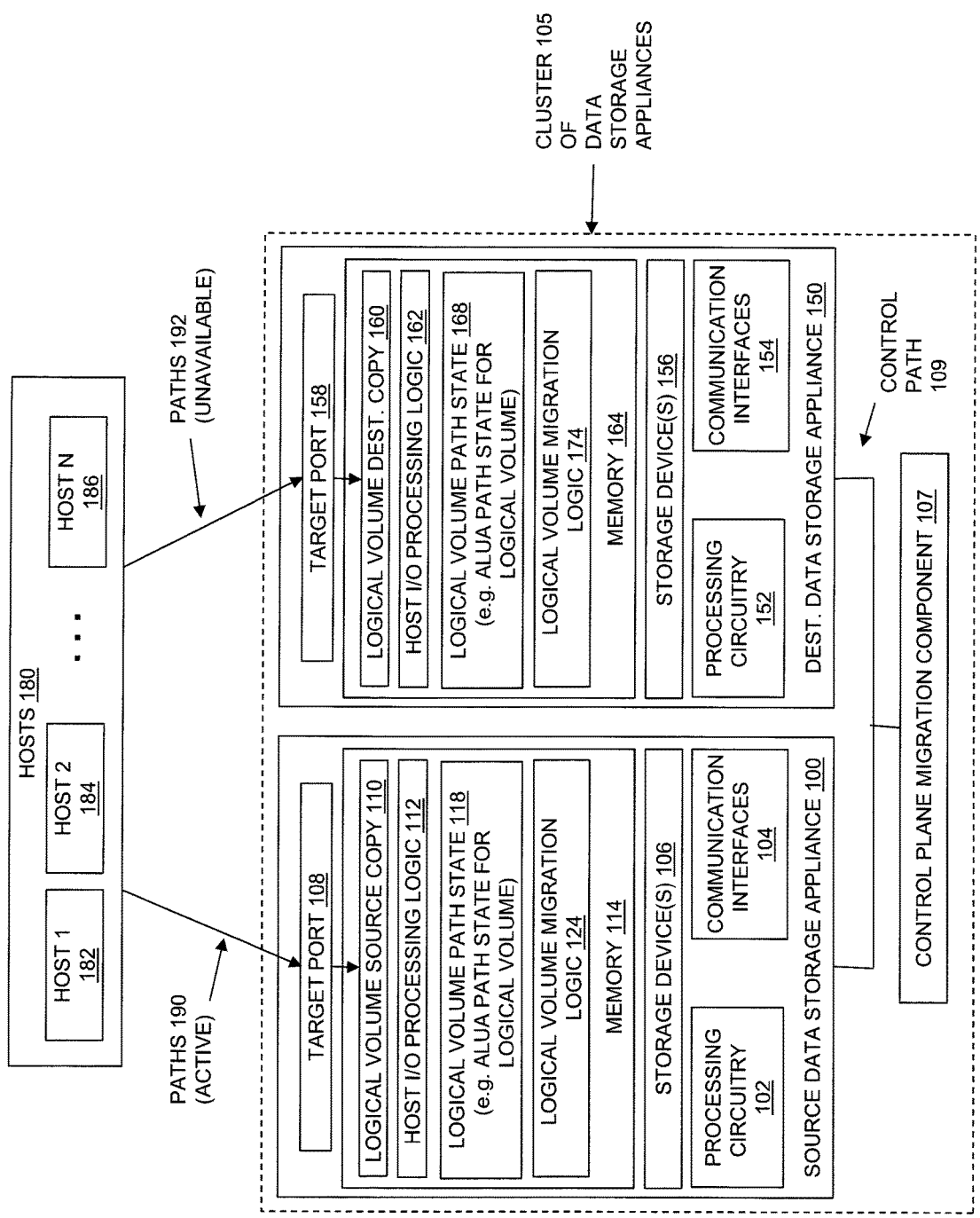
FIG. 3 is a block diagram showing an example of components in some embodiments after hosts have performed rescans on the data storage appliances.
Figure 4:
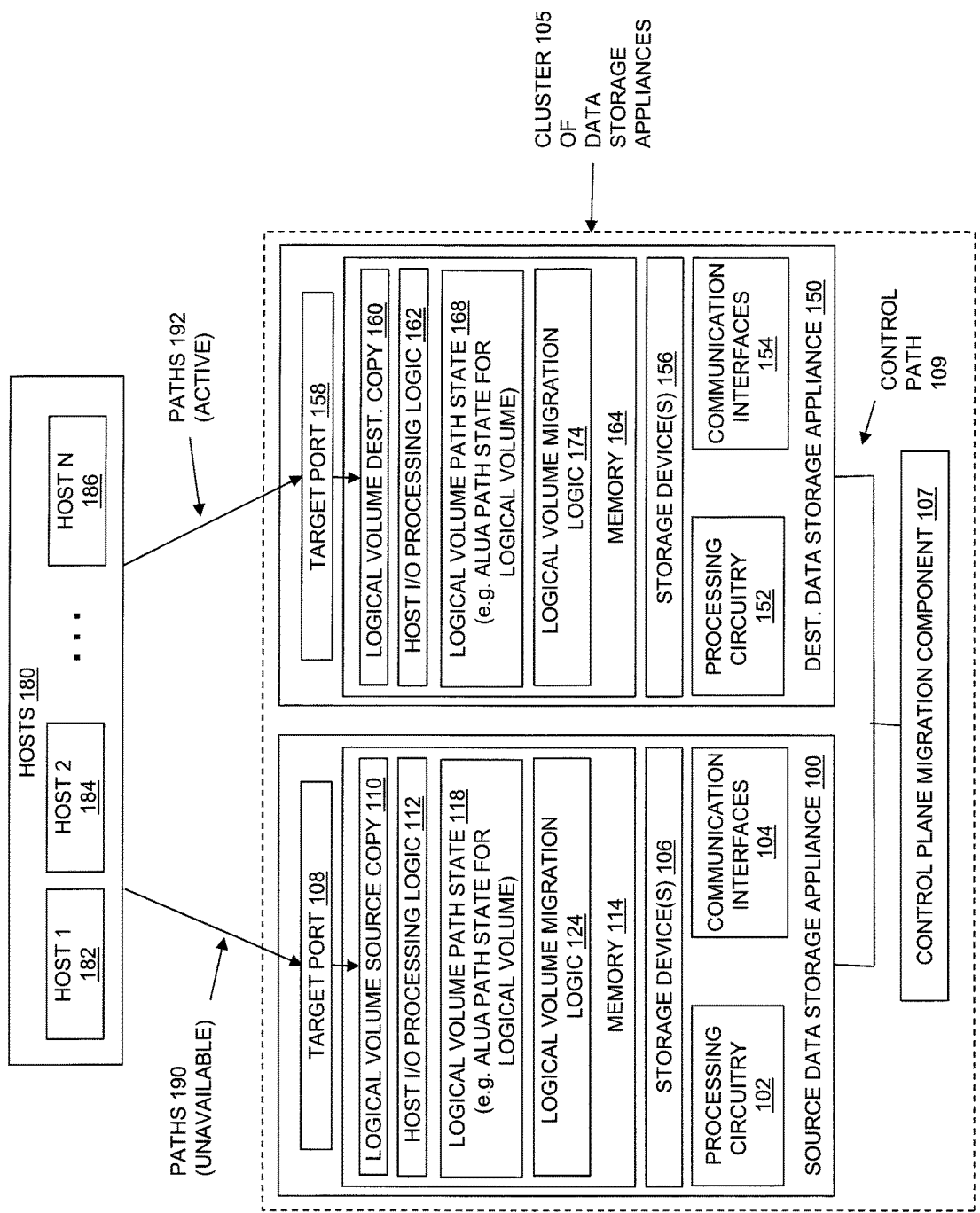
FIG. 4 is a block diagram showing an example of components in some embodiments after the logical volume has been migrated from the source data storage appliance to the destination data storage appliance.

FIG. 3 is a block diagram showing an example of components in some embodiments after one or more hosts in Hosts 180 have performed SCSI rescans on the data storage appliances in Cluster 105. As shown in FIG. 3, after the SCSI Rescans 200 shown in FIG. 2 are performed, one or more of the hosts in Hosts 180 have discovered Paths 192 through Target Port 158 to Logical Volume Destination Copy 160. FIG. 3 shows the Paths 190 and Paths 192 having path states prior to migration of the logical volume from Source Data Storage Appliance 100 to Destination Data Storage Appliance 150, i.e. Paths 190 have a path state of active, and Paths 192 have a path state of unavailable. Accordingly, in FIG. 3 hosts in Hosts 180 access the logical volume in Source Data Storage Appliance 100, e.g. through Target Port 108.

FIG. 4 is a block diagram showing an example of components in some embodiments after the logical volume has been migrated from Source Data Storage Appliance 100 to Destination Data Storage Appliance 150. As shown in FIG. 4, after the migration process has been completed, the path states of Paths 190 and Paths 192 have been switched. Accordingly, after the migration process is complete, the path state of Paths 190 has been changed to unavailable, and the path state of Paths 192 has been changed to active.

Accordingly, in response to the path states shown in FIG. 4 (as may be stored in Logical Volume Path State 118 and/or Logical Volume Path State 168), hosts in Hosts 180 that accessed the logical volume in Source Data Storage Appliance 100 (e.g. by accessing Logical Volume Source Copy 110) prior to the migration process access the logical volume in Destination Storage Appliance 150 (by accessing Logical Volume Destination Copy 160) after the migration process completes.

Figure 5:
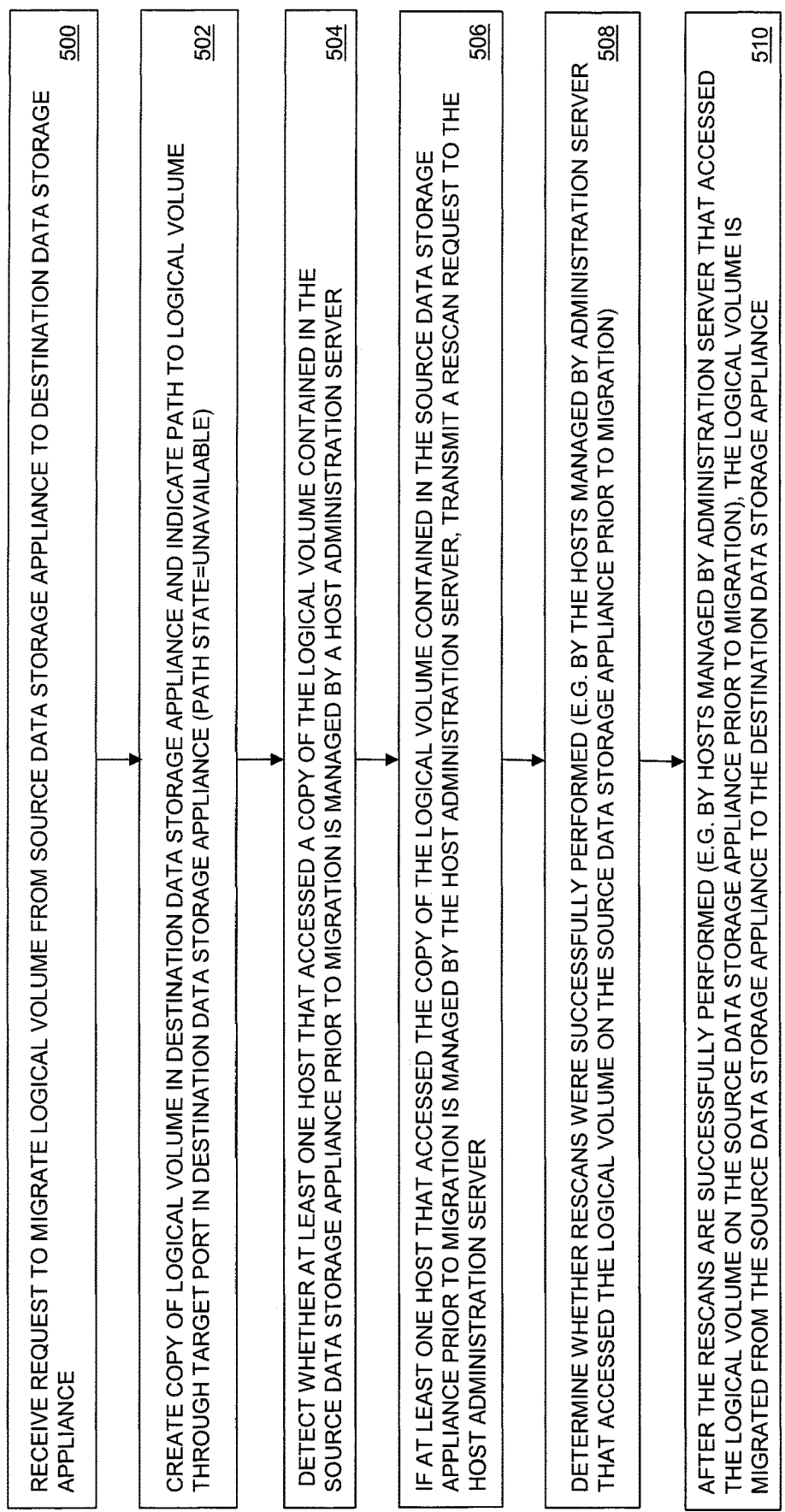
FIG. 5 is a flow chart showing an example of steps performed during operation of some embodiments.

FIG. 5 is a flow chart showing an example of steps performed during operation of some embodiments. At step 500, a request is received to migrate a logical volume from a source data storage appliance to a destination data storage appliance. For example, at step 500 Control Plane Component 107 receives Migration Request 197.

At step 502, a copy of the logical volume is created in the destination data storage appliance. For example, at step 502, Logical Volume Destination Copy 160 is created in Destination Data Storage Appliance 150. Further at step 502, the path state for paths to the copy of the logical volume in the destination data storage appliance is set to unavailable. For example, the path state for paths to Logical Volume Destination Copy 160 through Target Port 158 is set to unavailable in Logical Volume Path State 118 and/or Logical Volume Path State 168.

At step 504, in order to prepare for migrating the logical volume, the cluster of data storage appliances detects whether at least one host that is managed by a host administration server accesses the logical volume prior to the migration process on the source data storage appliance. For example, Control Plane Component 107 may query Host Administration Database 198 to determine whether any of the hosts that access the logical volume on Source Data Storage Appliance 100 prior to the migration process are managed by Host Administration Server 190.

At step 506, if at least one host that accesses the logical volume on the source data storage appliance prior to the migration process is managed by the host administration server, then the cluster of storage appliances transmits a rescan request to the host administration server. For example, if at least one of the hosts in Hosts 180 accesses the logical volume on Source Data Storage Appliance 100 prior to the migration process (e.g. accesses the Logical Volume Source Copy 110 prior to the migration process), then Control Plane Component 107 transmits Rescan Request 192 to Host Administration Server 190. Rescan Request 192 causes Host Administration Server 190 to transmit Rescan Commands 194 to Hosts 180. Rescan Commands 194 cause one or more of the hosts in Hosts 180 (e.g. at least those hosts in Hosts 180 that accessed the logical volume in Source Data Storage Appliance 100 prior to the migration process, or alternatively all of the hosts in Hosts 180) to perform a SCSI rescan operation on the data storage appliances in Cluster 105, thereby allowing such hosts in Hosts 180 to discover a new path to the logical volume (e.g. a path to Logical Volume Destination Copy 160 through Target Port 158).

At step 508, a determination is made as to whether SCSI rescan operations have been performed for all hosts that accessed the logical volume on Source Data Storage Appliance 100 prior to the migration process. For example, in the use case where all hosts that accessed the logical volume on Source Data Storage Appliance 100 prior to the migration process are within the Hosts 180, and accordingly all hosts that accessed the logical volume on Source Data Storage Appliance 100 prior to the migration process are managed by Host Administration Server 190, Control Plane Component 107 may check a completion status in one of the APIs 195 to detect whether Rescan Request 192 resulted in SCSI rescan operations being automatically performed on those hosts within Hosts 180. In the case where one or more hosts that accessed the logical volume on the Source Data Storage Appliance 100 prior to the migration process are not within Hosts 180, and are accordingly not managed by Host Administration Server 190, a SCSI rescan operations must be manually be performed on those hosts. In the case where one of the APIs 195 indicates that the SCSI rescan failed or could not be automatically performed on one or more of the hosts in Hosts 180 that accessed the logical volume on Source Data Storage Appliance 100 prior to the migration process, then a SCSI rescan operation must manually be performed on those hosts as well. FIG. 3 shows an example of the path states after the SCSI rescan operations have been performed for all hosts that accessed the logical volume on Source Data Storage Appliance 100 prior to the migration process.

At step 510, after SCSI rescan operations have been successfully performed on all hosts that accessed the logical volume on the Source Data Storage Appliance 100 prior to the migration process, the logical volume can be migrated from the Source Data Storage Appliance 100 to the Destination Data Storage Appliance 150. For example, migrating the logical volume from Source Data Storage Appliance 100 to Destination Data Storage Appliance 150 includes moving the host data storage in Logical Volume Source Copy 110 to Logical Volume Destination Copy 160, setting the path state each path in Paths 190 to unavailable, and setting the path state for each path in Paths 192 active. After the migration process completes, in response to the new paths states (see FIG. 4), hosts are able to access the logical volume in the Destination Data Storage Appliance 150 by accessing Logical Volume Destination Copy 160 through Target Port 158 over Paths 192, and access to the logical volume on Source Data Storage Appliance 100 is discontinued.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
during preparation for migrating a logical volume from a source data storage appliance to a destination data storage appliance, detecting whether at least one host that accesses a copy of the logical volume contained in the source data storage appliance is managed by a host administration server; and
in response to detecting that at least one host that accesses the copy of the logical volume contained in the source data storage appliance is managed by the host administration server, transmitting a rescan request to the host administration server that causes the host administration server to instruct each host that is managed by the host administration server and accesses the copy of the logical volume contained in the source data storage appliance to perform a rescan operation to discover at least one new path to the logical volume.

2. The method of claim 1, wherein detecting whether at least one host that accesses a copy of the logical volume contained in the source data storage appliance is managed by the host administration server, and transmitting the rescan request to the host administration server, are performed in response to receiving a request to migrate the logical volume from the source data storage appliance to the destination data storage appliance.

3. The method of claim 2, further comprising:
prior to transmitting the host rescan request to the host administration server,
creating a copy of the logical volume that is contained in the destination data storage appliance, wherein a path to the copy of the logical volume contained in the destination data storage appliance is discoverable by the rescan operation performed by each host that is managed by the host administration server and accesses the copy of the logical volume contained in the source data storage appliance.

4. The method of claim 3, further comprising:
wherein the path to the copy of the logical volume contained in the destination storage appliance includes a target port contained in the destination data storage appliance through which the copy of the logical volume contained in the destination data storage appliance can be accessed.

5. The method of claim 4, further comprising:
setting a path state of the path to the copy of the logical volume contained in the destination data storage appliance to unavailable.

6. The method of claim 5, further comprising
wherein setting the path state of the path to the copy of the logical volume contained in the destination data storage appliance to unavailable includes storing the path state of the path to the copy of the logical volume contained in the destination storage appliance in the source data storage appliance.

7. The method of claim 6, further comprising:
wherein setting the path state of the path to the copy of the logical volume contained in the destination data storage appliance to unavailable includes storing the path state of the path to the copy of the logical volume contained in the destination storage appliance in the destination data storage appliance.

8. The method of claim 7, further comprising:
migrating the logical volume from the source data storage appliance to the destination data storage appliance in response to detecting that each host that accessed the copy of the logical volume contained in the source data storage appliance prior to migration of the logical volume has performed a rescan operation.

9. The method of claim 8, wherein migrating the logical volume from the source data storage appliance includes moving host data stored in the copy of the logical volume contained in the source data storage appliance to the copy of the logical volume contained in the destination data storage appliance.

10. The method of claim 9, wherein migrating the logical volume from the source data storage appliance includes changing the path state of the path to the copy of the logical volume contained in the destination data storage appliance from unavailable to active.

11. The method of claim 10, wherein migrating the logical volume from the source data storage appliance to the destination data storage appliance includes changing a path state of a path to the copy of the logical volume contained in the source data storage appliance from active to unavailable.

12. A system comprising:
processing circuitry; and
memory having program code stored thereon that is executable on the processing circuitry, wherein the program code, when executed on the processing circuitry, causes the processing circuitry to:
during preparation for migrating a logical volume from a source data storage appliance to a destination data storage appliance, detect whether at least one host that accesses a copy of the logical volume contained in the source data storage appliance is managed by a host administration server, and
in response to detecting that at least one host that accesses the copy of the logical volume contained in the source data storage appliance is managed by the host administration server, transmit a rescan request to the host administration server that causes the host administration server to instruct each host that is managed by the host administration server and accesses the copy of the logical volume contained in the source data storage appliance to perform a rescan operation to discover at least one new path to the logical volume.

13. The system of claim 12, wherein the program code, when executed on the processing circuitry, further causes the processing circuitry to detect whether at least one host that accesses a copy of the logical volume contained in the source data storage appliance is managed by the host administration server, and transmit the rescan request to the host administration server, in response to receipt of a request to migrate the logical volume from the source data storage appliance to the destination data storage appliance.

14. The system of claim 13, wherein the program code, when executed on the processing circuitry, further causes the processing circuitry to:
prior to transmitting the host rescan request to the host administration server,
create a copy of the logical volume that is contained in the destination data storage appliance, wherein a path to the copy of the logical volume contained in the destination data storage appliance is discoverable by the rescan operation performed by each host that is managed by the host administration server and accesses the copy of the logical volume contained in the source data storage appliance.

15. The system of claim 14, further comprising:
wherein the path to the copy of the logical volume contained in the destination storage appliance includes a target port contained in the destination data storage appliance through which the copy of the logical volume contained in the destination data storage appliance can be accessed.

16. The system of claim 15, wherein the program code, when executed on the processing circuitry, further causes the processing circuitry to:
set a path state of the path to the copy of the logical volume contained in the destination data storage appliance to unavailable.

17. The system of claim 16, wherein the program code, when executed by the processing circuitry, further causes the processing circuitry to:
set the path state of the path to the copy of the logical volume contained in the destination data storage appliance to unavailable at least in part by storing the path state of the path to the copy of the logical volume contained in the destination storage appliance in the source data storage appliance.

18. The system of claim 17, wherein the program code, when executed by the processing circuitry, further causes the processing circuitry to:

set the path state of the path to the copy of the logical volume contained in the destination data storage appliance to unavailable at least in part by storing the path state of the path to the copy of the logical volume contained in the destination storage appliance in the destination data storage appliance.

19. The system of claim 18, wherein the program code, when executed by the processing circuitry, further causes the processing circuitry to:

migrate the logical volume from the source data storage appliance to the destination data storage appliance in response to detecting that each host that accessed the copy of the logical volume contained in the source data storage appliance prior to migration of the logical volume has performed a rescan operation.

20. A non-transitory computer readable medium, the non-transitory medium having a set of instructions stored thereon, the set of instructions, when executed on processing circuitry, causes the processing circuitry to perform the steps of:

during preparation for migrating a logical volume from a source data storage appliance to a destination data storage appliance, detecting whether at least one host that accesses a copy of the logical volume contained in the source data storage appliance is managed by a host administration server; and in response to detecting that at least one host that accesses the copy of the logical volume contained in the source data storage appliance is managed by the host administration server, transmitting a rescan request to the host administration server that causes the host administration server to instruct each host that is managed by the host administration server and accesses the copy of the logical volume contained in the source data storage appliance to perform a rescan operation to discover at least one new path to the logical volume.

* * * * *